United States Patent [19]
Agematsu

[11] Patent Number: 5,698,920
[45] Date of Patent: Dec. 16, 1997

[54] SMALL ELECTRIC MOTOR

[75] Inventor: Ikuo Agematsu, Nagano, Japan

[73] Assignee: Kabushiki Kaisha Sankyo Seiki Seisakusho, Nagano, Japan

[21] Appl. No.: 580,182

[22] Filed: Dec. 28, 1995

[30] Foreign Application Priority Data

Dec. 28, 1994 [JP] Japan .............................. HEI.6-337709

[51] Int. Cl.$^6$ ..................................................... H20K 37/00
[52] U.S. Cl. ......................... 310/254; 310/259; 310/49 R
[58] Field of Search ................................. 310/254, 259, 310/49 R, 164

[56] References Cited

U.S. PATENT DOCUMENTS 4,972,109  11/1990  Kakizaki et al. ...................... 310/49 A
5,260,616  11/1993  Mizutani et al. ...................... 310/49 R

*Primary Examiner*—Clayton E. LaBalle
*Assistant Examiner*—Timothy A. J. Williams
*Attorney, Agent, or Firm*—Sughrue,Mion,Zinn,Macpeak & Seas, PLLC

[57] ABSTRACT

A small electric motor includes a first stator unit including a first outside stator, a first inside stator, and a coil between the first outside stator and the first inside stator; and a second stator unit including a second outside stator, a second inside stator, and a coil between the second outside stator and the second inside stator, in such a manner that the first and second stator units are set one on another in such a manner that the first and second inside stators are positioned between the first and second outside stators. In the motor, the first stator unit has a first holding section which is adapted to position the second inside stator while the second stator unit has a second holding section which is adapted to position the first inside stator.

9 Claims, 10 Drawing Sheets

SMALL ELECTRIC MOTOR

BACKGROUND OF THE INVENTION

1. Field of the Invention

This invention relates to a small electric motor such as a stepping motor, and more particularly to an improvement of a small electric motor which comprises a stack of stator units each of which is made up of an outside stator and an inside stator.

2. Related Art

A small electric motor is known in the art of which the stator structure is of a stack of stator units each of which is made up of an inside stator and an outside stator. For instance, a stepping motor has a stator structure as shown in FIG. 13. That is, the stator structure comprises: a first stator unit 34; and a second stator unit 38. The first stator unit 34 includes: a first outside stator 31 which has pole teeth 31$b$ and forms an outer periphery of the motor casing, a first inside stator 32 having pole teeth 32$b$, and a coil 33 wound on a coil bobbin held between those first inside and outside stators 32 and 31. On the other hand, the second stator unit 38 includes: a second outside stator 35 which has pole teeth 35$b$ and forms an outer periphery of the motor casing, a second inside stator 36 having pole teeth 36$b$, and a coil 37 wound on a coil bobbin held between those second inside and outside stators 35 and 36. Those first and second stator units 34 and 38 are stacked one on another in such a manner that the two inside stators 32 and 36 are located between the coils 33 and 37. Thus, the aimed stator structure has been formed. And a rotor 39 is arranged at the center of the stator structure in such a manner as to confront with the pole teeth 31$b$, 32$n$, 35$b$ and 36$b$.

More specifically, the stator structure is designed as follows: First, two inside stators 32 and 36 as shown in the part (A) of FIG. 14 are prepared which are equal in configuration to each other, having four protrusions 32$a$ and four protrusions 36$a$ which are symmetrical with respect to sectional line B—B passing through the center of rotation of the rotor. The two inside stators 32 are set back to back with their pole teeth extended in the opposite directions which have been bent in one and the same direction. Under this condition, the inside stators are fixedly joined together with the protrusions 32$a$ and 36$a$ set together which are symmetrical with respect to the aforementioned sectional line B—B. Thereafter, the coils 33 and 37 are set as was described above, and the inside stators 32 and 36 thus joined are held between the outside stators 31 and 35. In this case, as shown in FIG. 15, the peripheries of the outside stators 31 and 35 have cuts 31$a$ and 35$a$ in correspondence to the protrusions 32$a$ and 36$a$, respectively. The protrusions 32$a$ and 36$a$ are equal in configuration, and are fixedly stacked at the same position, and therefore the cuts 31$a$ and 35$a$ are also formed at equal positions. Now, with the protrusions 32$a$ and 36$a$ fitted in the cuts 31$a$ and 35$a$, the stator structure is positioned both circumferentially and axially. In this connection, the inside stators 32 and 36 may be not constant in thickness. Hence, the depth T2 of the cuts 31$a$ and 35$a$ is made larger than the thickness T1 of the inner stators 32 and 36 (T1<T2).

As was described above, in the stator structure, T1<T2, and therefore a gap G is formed as shown in FIG. 15. This gap G allows the protrusions 32$a$ and 36$a$ to axially freely move. Hence, as shown in FIG. 16 the inside stators 32 and 36 thus joined are shifted in the gap G (not being held middle in the gap G in the axial direction). Originally, the line L along which the outside stators 31 and 35 are abutted against each other should be equal to the line M along which the inside stators 32 and 36 are jointed together. However, as shown in FIG. 16, the line L is shifted from the line M. If, in the stator structure, the amount of shift between those two lines L and M is not constant depending on the positions of the protrusions; more specifically, different amounts of shift (between the lines M and L) are provided at four positions where the protrusions 32$a$ and 36$a$ of the inside stators joined together are engaged with the cuts 31$a$ and 35$a$ of the outside stators, then the inside stators 32 and 36 are inclined with respect to the outside stators 31 and 35. In this operation, it should be noted that the joined inside stators 32 and 36 have the pole teeth. The pole teeth on one side are shifted inwardly (or towards the center) when the inside stators are inclined with respect to the outside stators, thus decreasing the effective inside diameter of the stator. As a result, the gap between the rotor 39 and the inside stators 32 and 36 is made smaller than the designed value, which obstructs the miniaturization of the electric motor. On the other hand, sometimes those lines L and M may be shifted as much as one and the same distance at the four positions where the protrusions 32$a$ and 36$a$ of the joined inside stators are engaged with the cuts 31$a$ and 35$a$ of the outside stators; however, since the lines are shifted, the resultant motor is not so high in performance as expected.

SUMMARY OF THE INVENTION

Accordingly, an object of the invention is to provide a small electric motor in which its joined inside stators 32 and 36 are held at the designed center with high accuracy.

There is provided a small electric motor comprising a first stator unit including a first outside stator forming a part of a motor casing, a first inside stator provided inside said motor, and a coil between said first outside stator and said first inside stator; and a second stator unit including a second outside stator forming a part of said motor casing, a second inside stator provided inside said motor, and a coil between said second outside stator and said second inside stator, wherein said first and second stator units is laid one on another in such a manner that said first and second inside stators are positioned between said coil of said first stator unit and said coil of said second stator unit, and said first stator unit has a first holding section which is adapted to position said second inside stator, and said second stator unit has a second holding section which is adapted to position said first inside stator.

As is apparent from the above description, in the small electric motor, the first holding section of the first outside stator positions the second inside stator, while the second holding section of the second outside stator positions the first inside stator. This feature makes it possible to hold the two inside stators at the designed center. Therefore, the motor thus formed is free from the difficulty that the inside stators are held oblique with respect to other members such as the outside stators and bobbins. Hence, the gap between the rotor and the inside stator has the designed value. The resultant small electric motor has been designed as planned.

BRIEF DESCRIPTION OF THE DRAWINGS

The upper part of FIG. 1 is a plan view of an example of a small electric motor, which is a first embodiment of the invention, and the lower part is an enlarged diagram showing essential components of the small electric motor.

Figure 10:
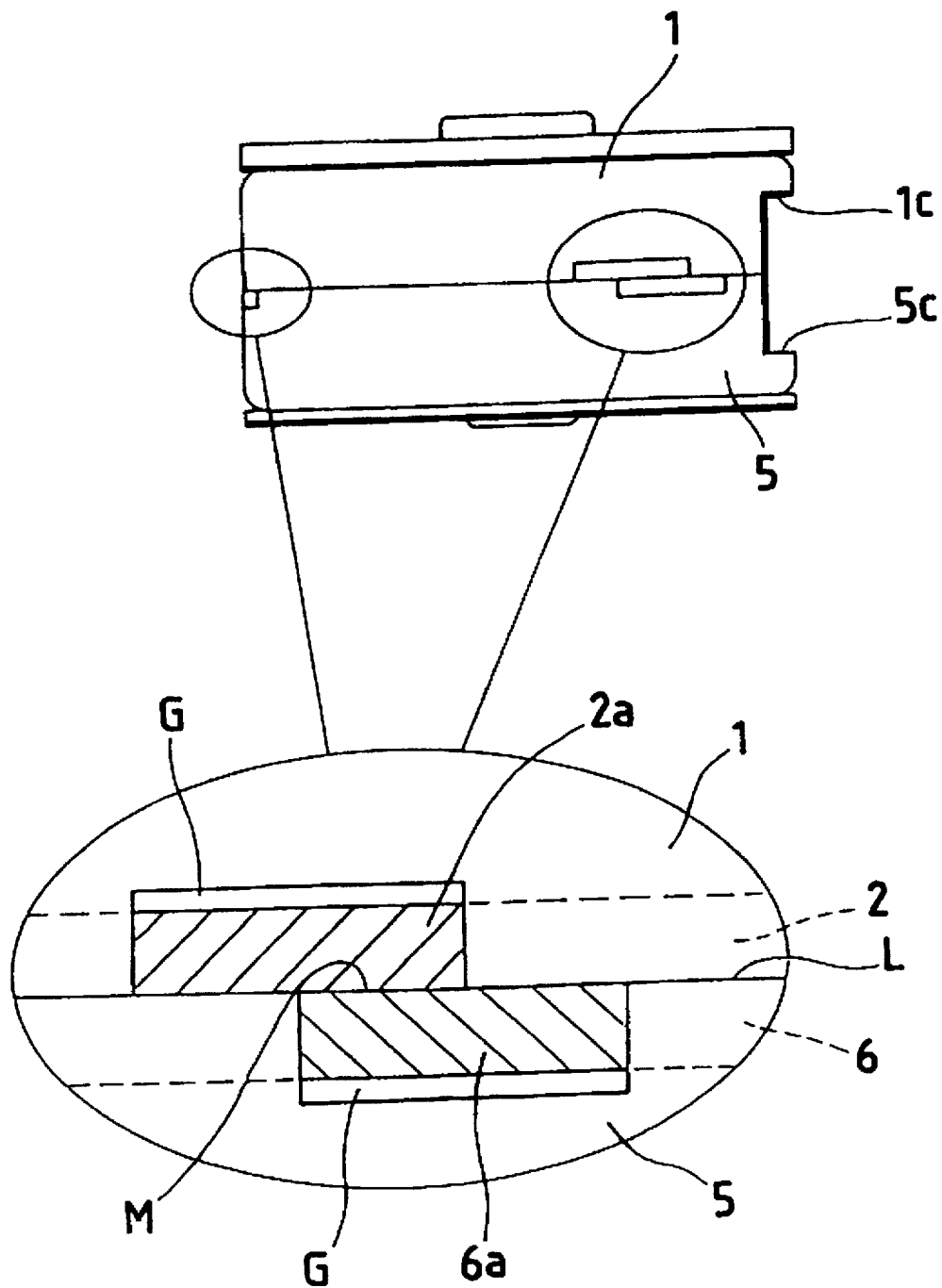
Figure 11:
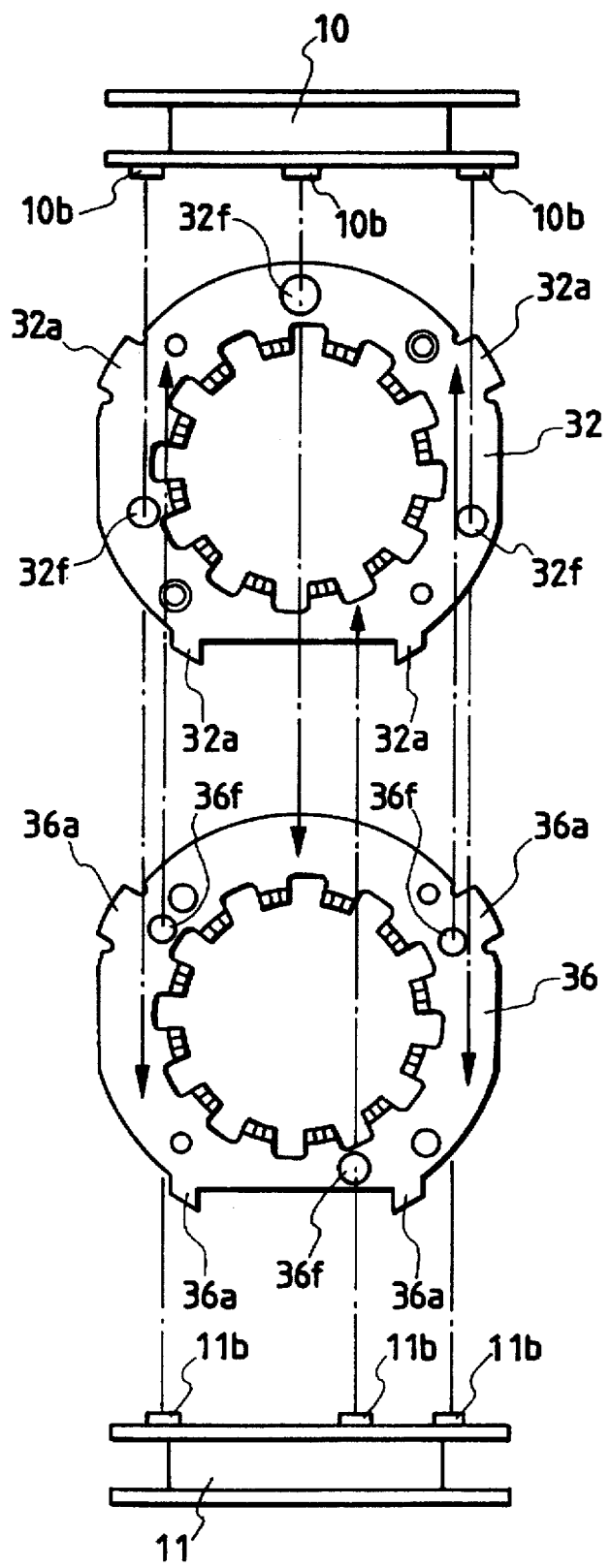
Figure 12:
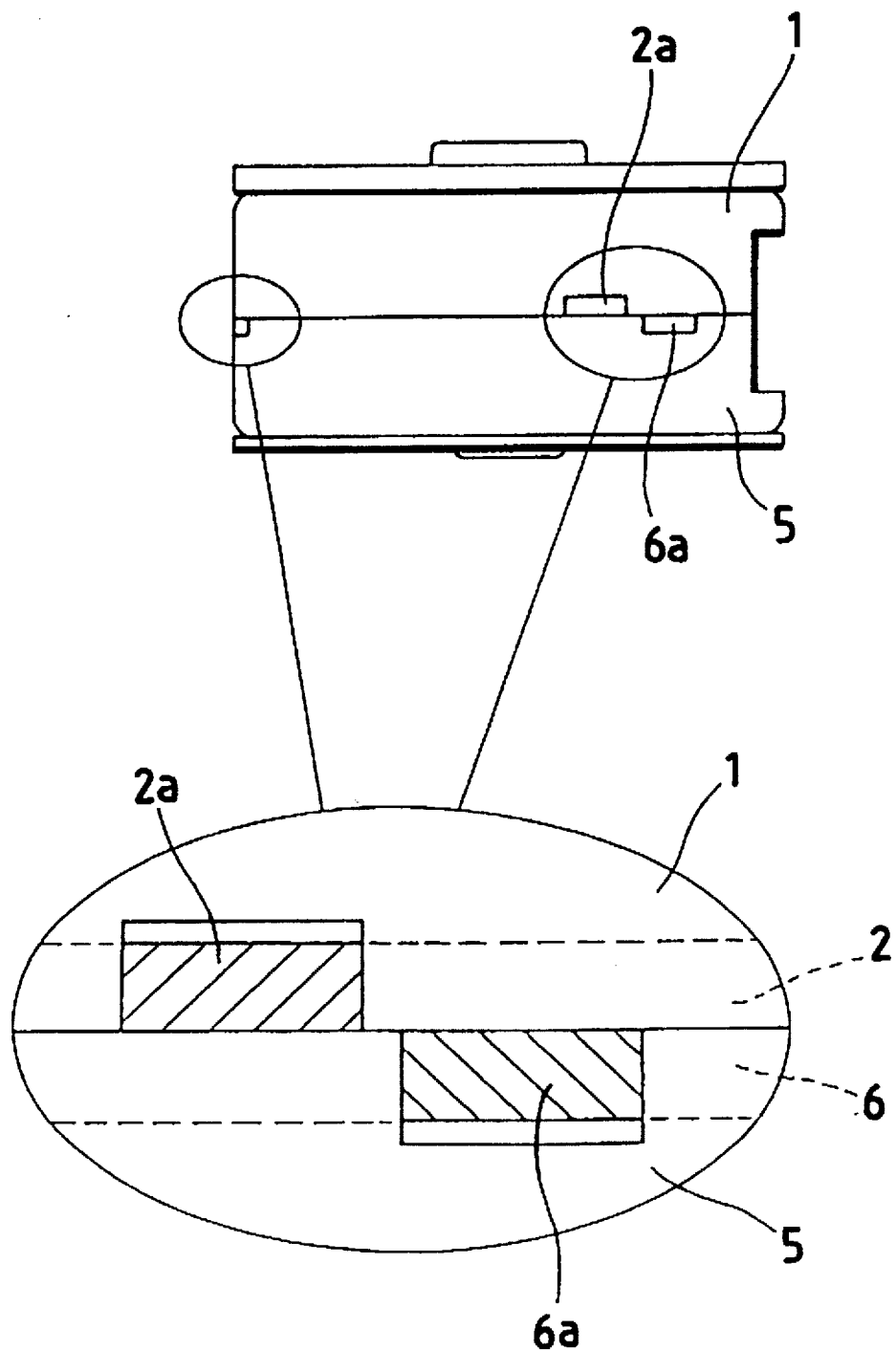
Figure 13:
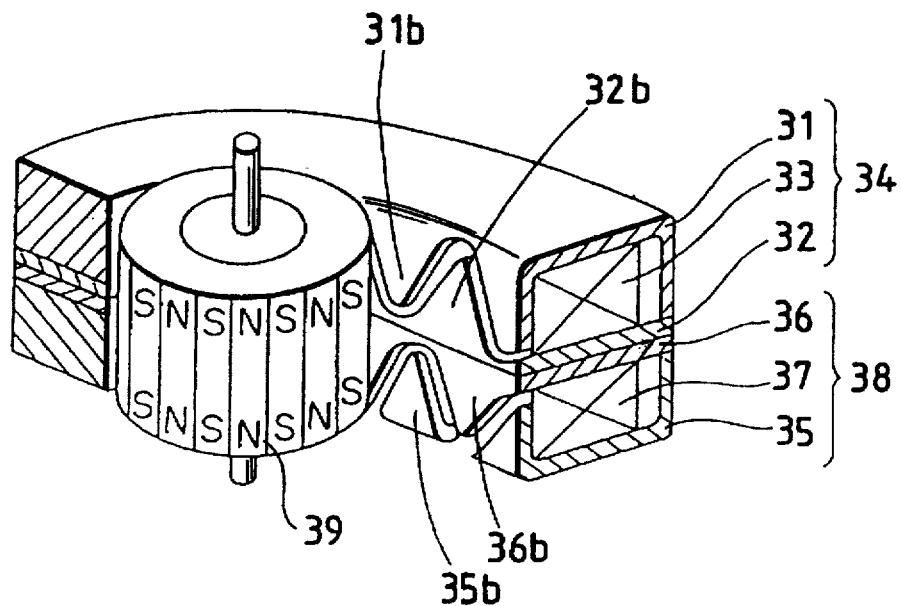
Figure 14A:
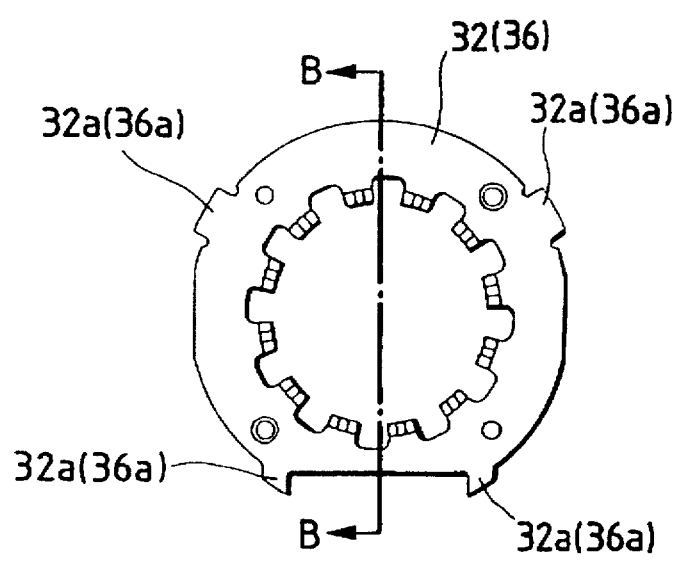
Figure 14B:
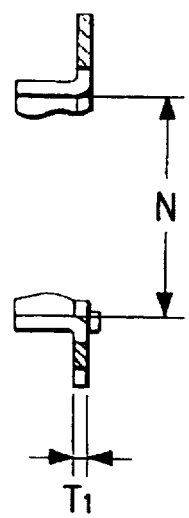
Figure 15:
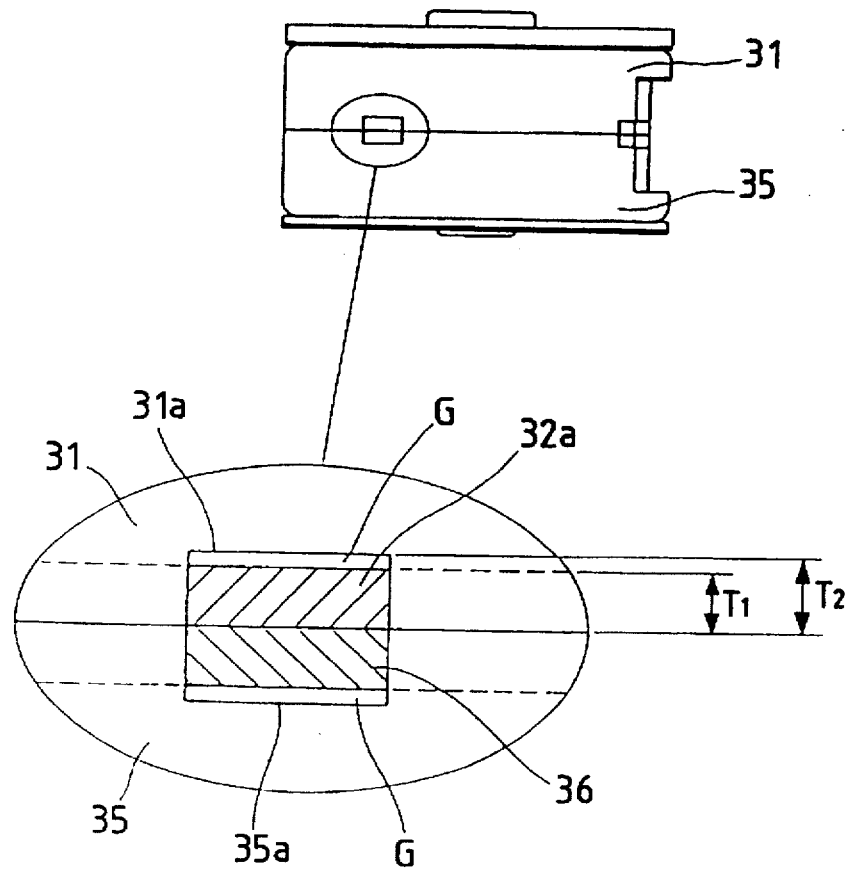
Figure 16:
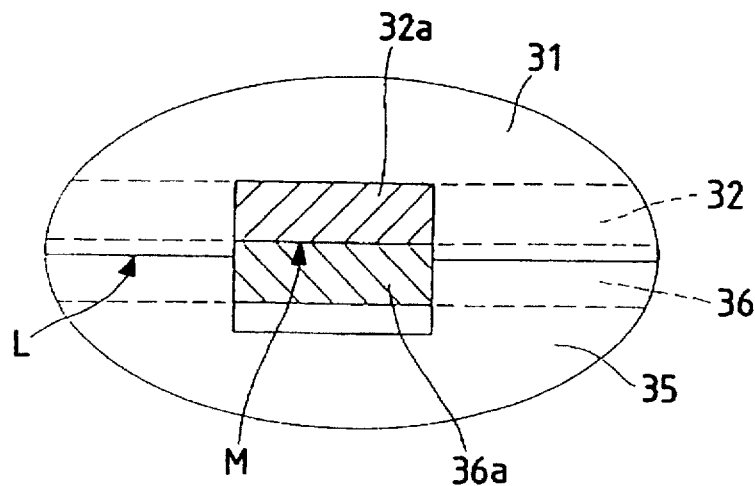

The upper part of FIG. 10 is a plan view of the second embodiment, and the lower part is an enlarged diagram showing essential components thereof;

FIG. 11 is an exploded view showing essential components of another example of the small electric motor, which constitutes a third embodiment of the invention;

The upper part of FIG. 12 is a plan view of the fourth embodiment, and the lower part is an enlarged diagram showing essential components thereof;

FIG. 13 is a diagram for a description of the fundamental arrangement of a small electric motor according to the invention;

FIGS. 14 (A) and 14 (B) show inside stators in a conventional small electric motor;

The upper part of FIG. 15 is a plan view of the conventional small electric motor, and the lower part is an enlarged diagram showing essential components thereof; and FIG. 16 is an enlarged diagram showing essential components for a description of difficulties accompanying the conventional small electric motor.

DETAILED DESCRIPTION OF THE PREFERRED EMBODIMENTS

The invention will be described with reference to the accompanying drawings in detail.
First Embodiment FIGS. 1 through 6 shows an example of a small electric motor, which constitutes a first embodiment of the invention. The small electric motor of the invention is similar to the above-described small electric motor, and is substantially equal in fundamental structure to the one shown in FIG. 13. That is; in the small electric motor of the invention, its stator structure comprises a first stator unit 4; and a second stator unit 8. The first stator unit 4 includes: a first outside stator 1 which has pole teeth 1b and forms an outer periphery of the motor casing; a first inside stator 2 having pole teeth 2b; and a coil 3 wound on a coil bobbin 10 held between those first inside and outside stators, whereas the second stator unit 8 includes: a second outside stator 5 which has pole teeth 5b and forms an outer periphery of the motor casing; a second inside stator 6 having pole teeth 6b; and a coil 7 wound on a coil bobbin 11 held between those second inside and outside stators 35 and 36. Those first and second stator units 4 and 8 are laid one on another in such a manner that the two inside stators 2 and 6 are located between the coils 3 and 7. Thus, the aimed stator structure has been substantially formed. And a rotor is arranged at the center of the stator structure in such a manner as to confront with the pole teeth 1b, 2b, 5b, and 6b.

Figure 4A:
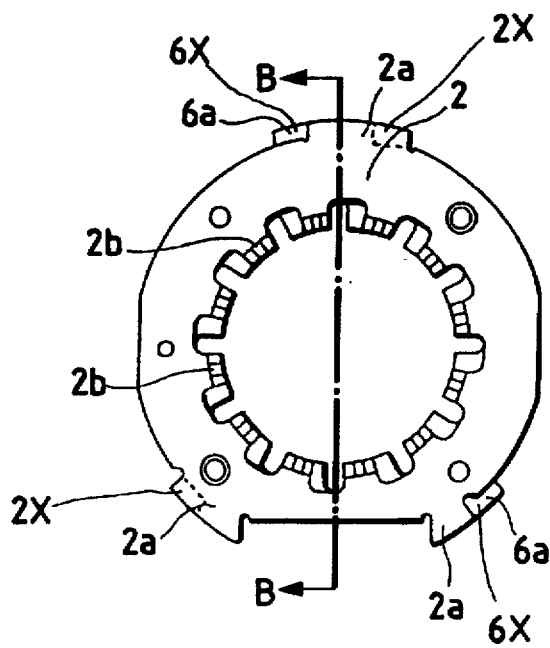
FIGS. 4 (A) and 4 (B) show the inside stators in the first embodiment which is laid one each other. More specifically, the part (A) of FIG. 4 is a plan view of the inside stators, and the part (B) is a sectional view taken along line B—B in the part (A)
Figure 4B:
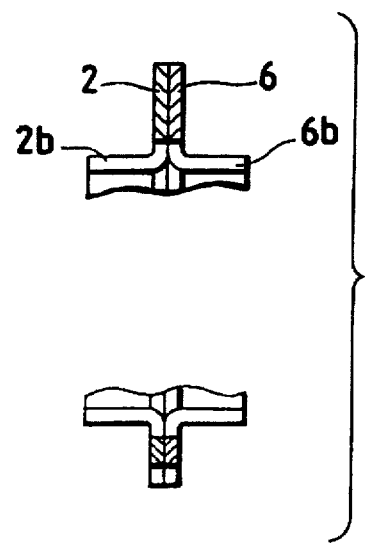
Figure 5A:
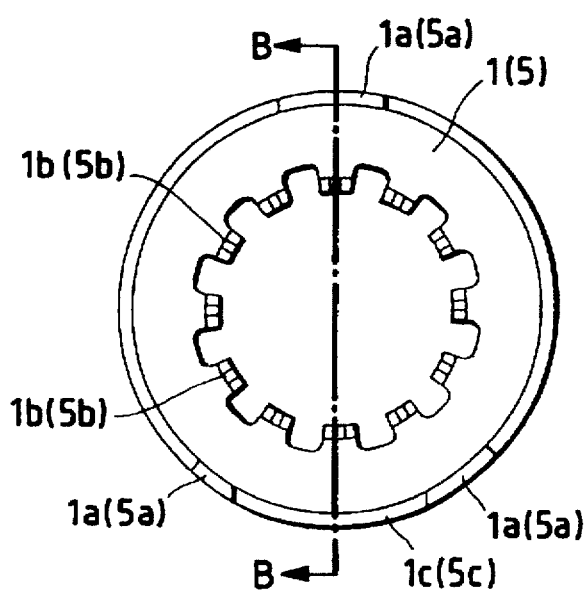
FIGS. 5 (A) and 5 (B) show outside stators in the first embodiment. More specifically, the part (A) of FIG. 5 is a plan view of the outside stators, and the part (B) is a sectional view taken along line B—B in the part (A)
Figure 5B:
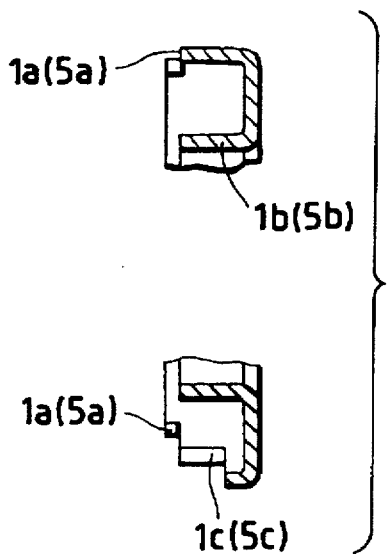

The stator structure is formed as follows: First, as shown in the part (A) of FIG. 3, the inside stators 2 and 6 are formed. That is, those inside stators 2 and 6 have protrusions 2a and 6a which are not symmetrical with respect to the sectional line B—B which passes through the center of the rotor. The inside stators 2 and 6 have the aforementioned protrusions 2a and 6a, pluralities of pole teeth 2b and 6b, pluralities of engaging holes 2c and 6c, pluralities of engaging protrusions 2d and 6d, and pluralities of bobbin-rotation preventing holes 2e and 6e, respectively. Thereafter, the inside stators 2 and 6 are set back to back with their pole teeth 2b and 6b extended in the opposite directions which have been bent in one and the same direction; and then the engaging protrusions 6d of the stator 6 are fixedly engaged with the engaging holes 2c of the stator 2 by caulking. Thus, the inside stators 2 and 6 have been fixedly secured to each other as shown in FIG. 4. In the resultant stator structure, the protrusions 2a and 6a are not symmetrical with the sectional line B—B, and therefore the protrusions 2a and 6a have surfaces which are exposed being shifted as indicated at 2X and 6X in FIG. 4 (hereinafter referred to as "shifted (exposed) surfaces 2X and 6X", when applicable).

Figure 1:
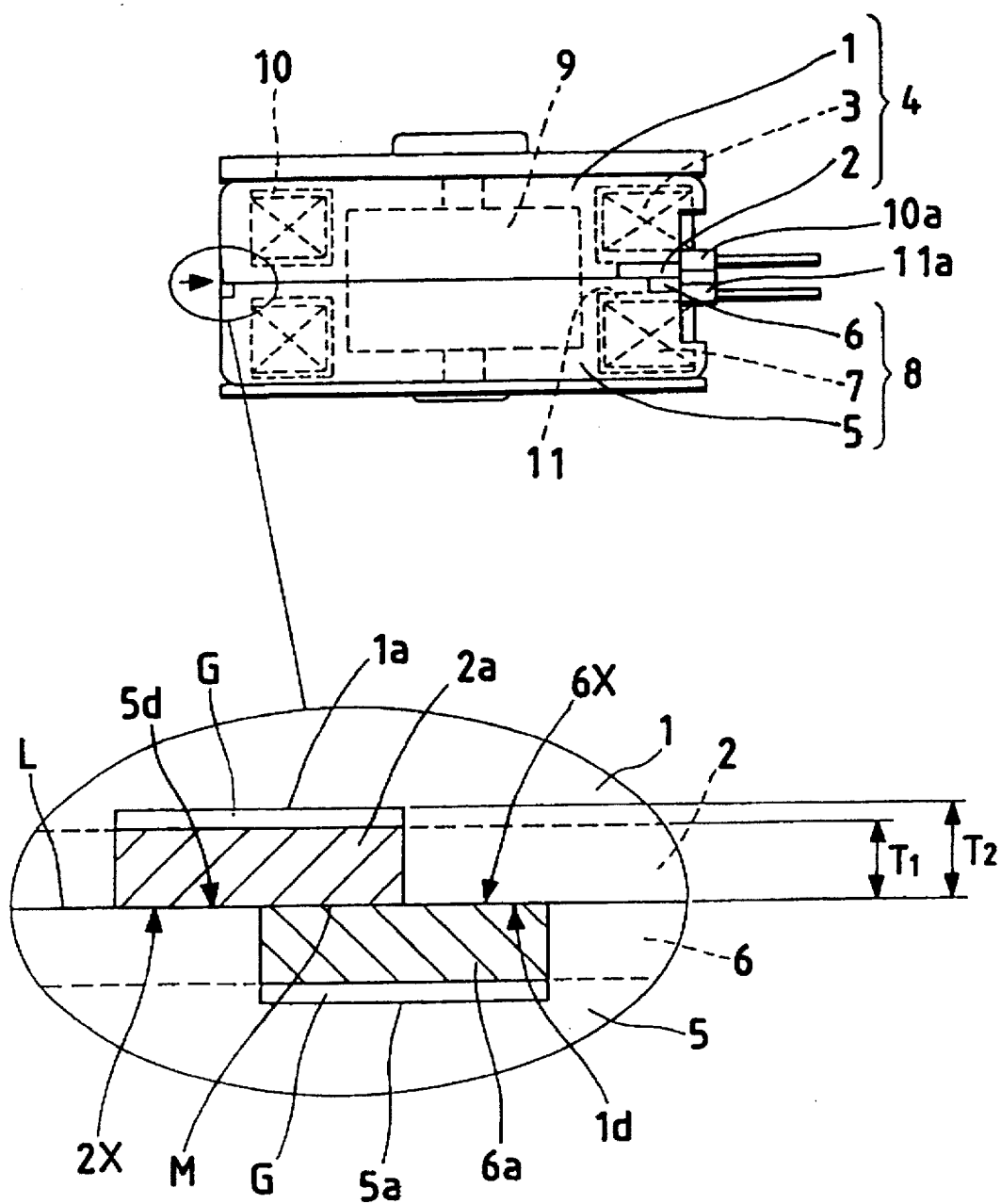
Figure 2:
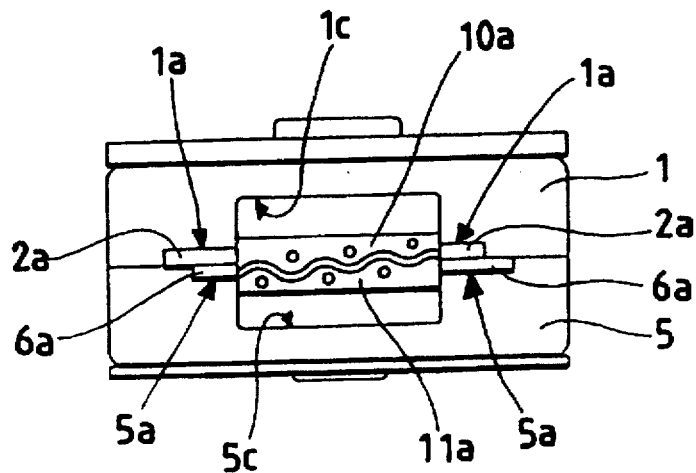
FIG. 2 is a front view of the small electric motor shown in FIG. 1.
Figure 3A:
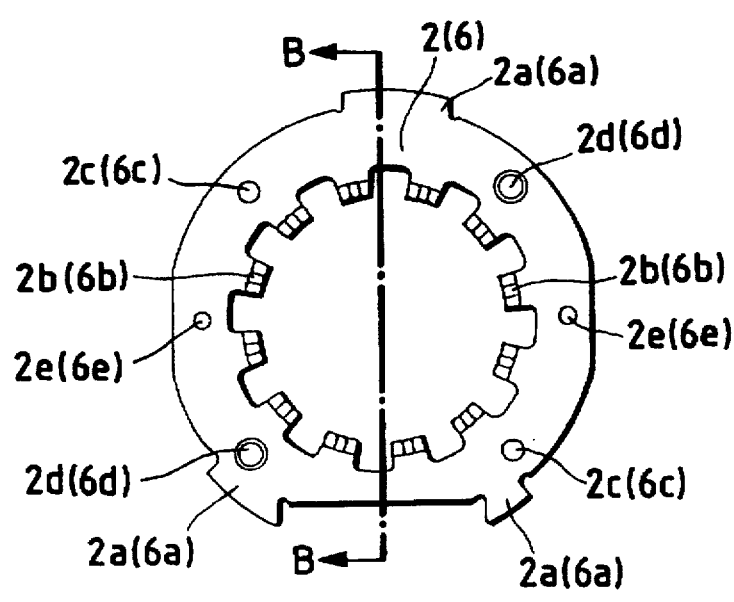
FIGS. 3 (A) and 3 (B) shows inside stator in the small electric motor shown in FIG. 1. More specifically, the part (A) of FIG. 3 is a plan view of the inside stator, and the part (B) is a sectional view taken along line B—B in the part (A)
Figure 3B:
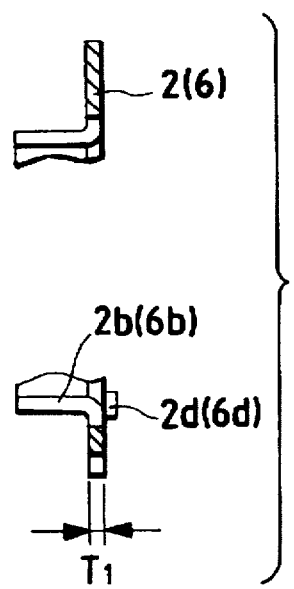

The bobbins 10 and 11 have small protrusions (not shown). Those protrusions are inserted into the bobbin-rotation preventing holes 2e and 6e, so that the bobbins 10 and 11 are secured to the stator 2 and 6, respectively. As shown in FIG. 1, the coils 3 and 7 are wound on the bobbins 10 and 11, respectively, which are then held between the outside stators 1 and 5. The outside stator 1 has a plurality of cuts 1a corresponding to the plurality of protrusions 2a, while the outside stator 5 has also a plurality of cuts 5a corresponding to the plurality of protrusions 6a. Moreover, the outside stators 1 and 5 have a plurality of pole teeth 1b and a plurality of pole teeth 5b, and large cuts 1c and 5c, respectively, with which terminals 10a and 11a of the bobbins 10 and 11 holding the coils 3 and 7 are engaged, respectively. Furthermore, as shown in FIG. 1, the cuts 1a of the outside stator 1 engage with the protrusions 2a of the inside stator 2, being substantially equal in circumferential length to the protrusions 2a of the inside stator 2, and being deeper as much as the gap G than the axial thickness of the protrusions 2a. Similarly, the cuts 5a of the outside stator 5 engage with the protrusions 6a of the inside stator 6, being substantially equal in circumferential length to the protrusions 6a of the inside stator 6, and being deeper as much as the gap G than the axial thickness of the protrusions 6a. Hence, when the two upper and lower stator units 4 and 8 are laid one on another with the inside stators 2 and 6 set between the coils 3 and 7, the protrusions 2a and 6a are not entirely placed on each other; that is, each protrusion 2a has the aforementioned shifted surface 2X which is abutted against the outside stator 5, while each protrusions 5a has the aforementioned shifted surface 5X which is abutted against the outside stator 1. Thus, the protrusions are axially positioned. In this case, the shifted surface 2X of the protrusion 2a is abutted against an abutting portion of the second outside stator 5 (hereinafter referred to as "a second holding section 5d", when applicable); and similarly the shifted surface 6X of the protrusion 6a is abutted against an abutting portion of the first outside stator 1 (hereinafter referred to as "a second holding section 1d", when applicable). The two inside stators 2 and 6 are circumferentially positioned by the two outside stators 1 and 5 as follows: That is, the positioning of the inside stators 2 and 6 are achieved by engaging the cuts 1a and 5a of the two outside stators 1 and 5 with the protrusions 2a and 6a of the two inside stators 2 and 6 (as described later in more detail). In this connection, similarly as in the case of the above-described conventional art, the depth T2 of the cuts 1a and 5a is made larger than the thickness T1 of the inner stators 2 and 6 (T1<T2), because the latter 2 and 6 may not be constant in thickness (T1). This difference is the gap G in the depth of each of the cuts 1a and 5a. However, with the inside stators 2 and 6 fixedly secured, the shifted surface 2X of each protrusion 2a is held by the second holding section 5d while the shifted surface 6X of each protrusion 6a is held by the first holding section 1d. Thus, the inside stators 2 and 6 are positioned in the axial position, setting between the gaps G and G.

The protrusions 2a and 6a are positioned not only in the axial direction but also in the circumferential direction. And the protrusions 2a and 6a are substantially equal in circumferential length to the cuts 1a and 5a. Hence, when the protrusions 2a and 6a are engaged with the cuts 1a and 5a, the former scarcely play in the circumferential direction. That is, the inside stators 2 and 6 are not turned with respect to the outside stators 1 and 5; that is, they are fixedly positioned in the circumferential direction. If the stators are circumferentially positioned at many points, then it may be rather difficulty to make the position of the stators high in dimensional accuracy. Hence, it is preferable that the number of stator positioning points is only one.

In the above-described embodiment, the inside stators are axially held by abutting the protrusions 2a of the inside stator 2 against the outside stator 5 and those 6a of the inside stator 6 against the outside stator 1. Hence, the line L along which the two outside stators 1 and 5 are abutted against each other is in alignment with the line M along which the two inside stators 2 and 6 are abutted against each other.

Figure 6:
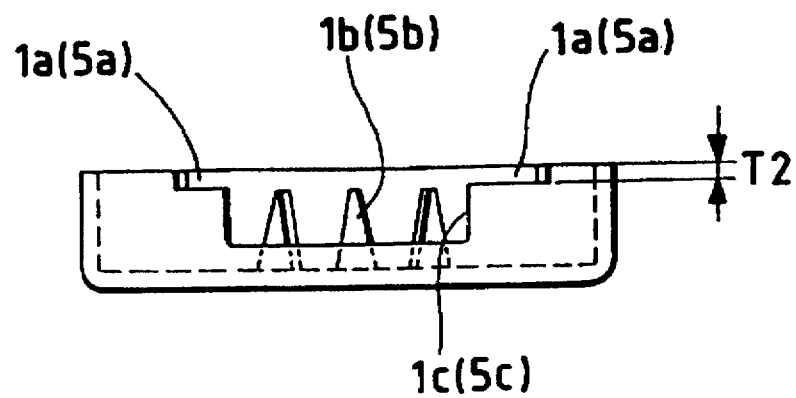
FIG. 6 is a front view showing the outside stator in the first embodiment.

Furthermore, in the embodiment, as shown in FIG. 6, two of the plurality of cuts 1a of one outside stator 1 are made integral with the large cut 1c in such a manner that the ends of the cuts 1a which are adjacent to each other are continuous with the large cut 1c of the outer stator 1. Similarly, two of the plurality of cuts 5a of the other outside stator 5 are made integral with the large cut 5c in such a manner that the ends of the cuts 5a which are adjacent to each other are continuous with the large cut 5c of the outer stator 5. That is, the points of engagement of the protrusions 2a and 6a and the cuts 1a and 5a are not uniform in circumferential interval. However, if, as in a second embodiment shown in FIGS. 7 through 10 below, the points of engagement of them are arranged uniform in circumferential direction, then it is possible to further improve the accuracy of the small electric motor.

Second Embodiment

The second embodiment of the invention is equal in fundamental arrangement to the above-described first embodiment; however, the former is different from the latter in the configuration and position of the protrusions 2a and 6a and the configuration and position of the cuts 1a and 5a. In the second embodiment, parts corresponding functionally to those in the above-described first embodiment are therefore designated by the same reference numerals or characters.

Figure 7:
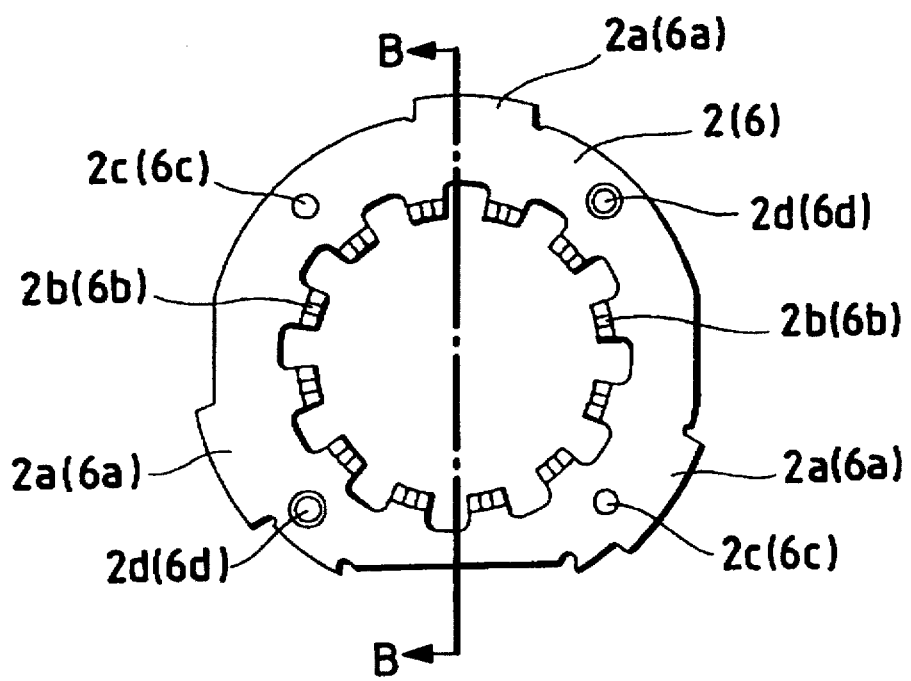
FIG. 7 is a plan view of an inside stator in another example of the small electrical motor, which constitutes a second embodiment of the invention.
Figure 8:
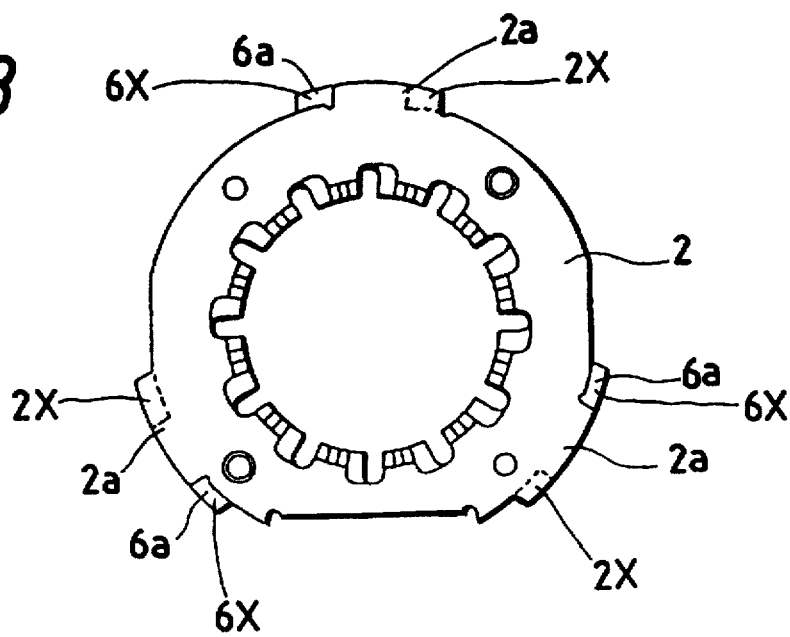
FIG. 8 is a plan view of the inside stators in the second embodiment which are laid on each other.
Figure 9A:
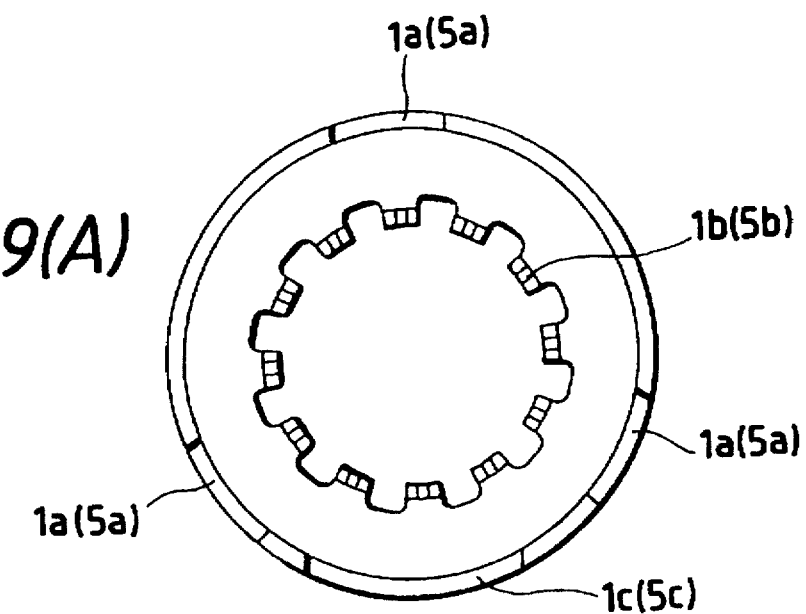
FIGS. 9 (A) and 9 (B) show an outside stator in the second embodiment. More specifically, the part (A) of FIG. 9 is a plan view of the outside stator; and the part (B) is a front view of the outside stator with its pole teeth omitted.
Figure 9B:
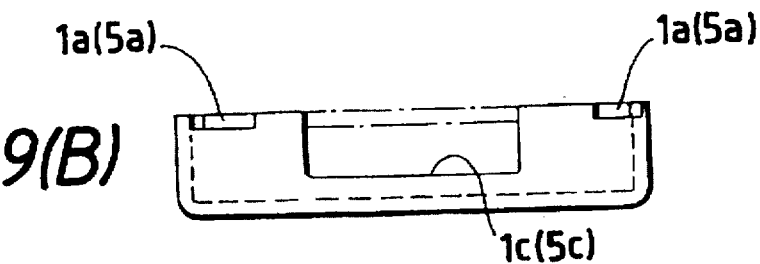

In the second embodiment, as shown in FIG. 7, the inside stators 2 and 6 have the same shape protrusions 2a and 6a at angular intervals of 120°, respectively. However, it should be noted that those protrusions 2a and 6a are not symmetrical with respect to the sectional line B—B (FIG. 7) passing through the center of the rotor as is seen from FIG. 7. On the other hand, as shown in FIG. 9, the outside stators 1 and 5 have the same shape cuts 1a and 5a at angular intervals of 120° in correspondence to the positions of the protrusions 2a and 6a. In other words, as shown in FIG. 10, the small electric motor has three pairs of protrusions 2a and 6a, and accordingly three pairs of cuts 1a and 5a in its outer periphery at angular intervals of 120°. The two inside stators are laid on each other as follows: First, as shown in FIG. 8, the inside stators 2 and 6, which are equal in configuration to each other and have the pole teeth which are bent and extended in the same direction, are set back to back in such a manner that the pole teeth are extended in the opposite directions. The inside stators 2 and 6 thus set are fixedly secured to each other. In the second embodiment, at each of the engagements of the protrusions 2a and 6a, the latter are shifted from each other, thus having shifted-portions (surfaces) 2X and 6X. Hence, all the protrusions 2a and 6a thus engaged are axially positioned. This feature improves the small electric motor in the accuracy of performance. The two (first and second) outside stators 1 and 5 are positioned and held in the same manner as in the above-described first embodiment. In the above-described embodiment, the number of pairs of protrusions 2a and 6a are three; however, the invention is not limited thereto or thereby—it may be two or four. For instance, if the protrusions 2a and 6a are made larger in width, then they are increased in mechanical strength, and therefore in this case, the motor may have only two pair of protrusions 2a and 6a.

Third Embodiment

Now, a third embodiment of the invention will be described with reference to FIG. 11.

In the conventional art shown in FIGS. 13 through 16, the joined inside stators 32 and 36 are not axially held; i.e., they may be shifted in one direction between the gaps G. This difficulty is eliminated by the third embodiment as follows: that is, in the third embodiment, the second holding sections 5d of the outside stator 5, which are adapted to hold the protrusions 2a of the inner stators 2, are formed on the bobbin 11; while the first holding sections 1d of the outside stator 1, which are adapted to hold the protrusions 6a of the inner stator 6, are formed on the bobbin 10. In FIG. 11 showing the third embodiment, parts corresponding functionally to those already described with reference to FIGS. 13 through 16, showing the conventional art, are therefore designated by the same reference numerals or characters. The inside stators 32 and 36 are in the same shape.

In the third embodiment, similarly as in the above-described conventional art, the inside stators 32 and 36 are fixedly set back to back. On the bobbin 10 of the upper (first) stator unit, three position holding protrusions 10b are provided which correspond to the first holding sections 1d of the first embodiment and are adapted to axially hold the inside stator; while on the bobbin 11 of the lower (second) stator unit, three position holding protrusions 11b are provided which correspond to the second holding sections 5d of the first embodiment and are adapted to axially hold the inside stator. The inside stator 32 has through-holes 32f in such a manner that the position holding protrusions 10b are inserted into the through-holes 32f and abutted against the other inside stator 36. In other words, the inside stator 36 is axially positioned by the ends of the position holding protrusions 10b of the bobbin 10 of the upper (first) stator unit. Similarly, the inside stator 36 also has through-holes 36f in such a manner that the position holding protrusions 11b are inserted into the through-holes 36f and abutted against the other inside stator 32. In other words, the inside stator 32 is axially positioned by the ends of the position holding protrusions 11b of the bobbin 11 of the lower stator unit.

While there has been described in connection with the preferred embodiments of the invention, it will be obvious to those skilled in the art that various changes and modifications may be made therein without departing from the invention. For instance, the first and second holding section may be formed on positioning boards provided on the sides of the outside stators, instead of the outside stators or bobbins. Furthermore, as shown in FIG. 12, the protrusions 2a and 6a may be so arranged that they are not overlapped with each other all. The outside stators 1 and 5 should have at least one cut 1a and one cut 5a, respectively and the inside stators 2 and 6 should have at least one protrusion 2a and one protrusion 6a, respectively; however, in order to assemble the motor with higher accuracy, it is preferable that they have a plurality of cuts and protrusions. In addition, in the inside and outside stators, the arrangement of the protrusions and cuts at equal angular intervals contributes greatly to the improvement in accuracy of the motor assembly work.

The invention has been described with reference to the small electric motor; however, it goes without saying that the technical concept of the invention may be applied to a general small electric motor in which a plurality of stator units are laid one on another.

As is apparent from the above description, in the small electric motor, the first holding section of the first outside stator positions the second inside stator, while the second holding section of the second outside stator positions the first inside stator. This feature makes it possible to hold the two inside stators at the designed center. Therefore, the motor thus formed is free from the difficulty that the inside stators are held oblique with respect to other members such as the outside stators and bobbins. Hence, the gap between the rotor and the inside stator has the designed value. The resultant small electric motor has been designed as planned.

What is claimed is:

1. A small electric motor comprising:

a first stator unit including a first outside stator forming a part of a motor casing, a first inside stator provided inside said motor, and a coil between said first outside stator and said first inside stator; and a second stator unit including a second outside stator forming a part of said motor casing, a second inside stator provided inside said motor, and a coil between said second outside stator and said second inside stator, wherein said first and second stator units are laid one on another in such a manner that said first and second inside stators are positioned between said coil of said first stator unit and said coil of said second stator unit, and said first stator unit has a first holding section which is adapted to position said second inside stator, and said second stator unit has a second holding section which is adapted to position said first inside stator, and wherein said first and second holding sections contact said first and second inside stators in the same contact plane which is also the contact plane between said first and second outside stators and between said first and second inside stators.

2. A small electric motor as claimed in claim 1, wherein said first outside stator has said first holding section and said second outside stator has said second holding section, and said first holding section of said first outside stator positions said second inside stator and said second holding section of said second outside stator positions said first inside stator.

3. A small electric motor as claimed in claim 2, wherein said first and second inside stators, and said first and second outside stators have pole teeth which are confronted with a rotor.

4. A small electric motor as claimed in claim 3, wherein said first and second inside stators have protrusions in outer peripheries thereof in such a manner that, when said protrusions of said first and second inside stators are laid on each other, said protrusions of said first and second inside stators have shifted portions, not partially overlapped with each other, said shifted portion of said protrusion of said second inside stator is held abutted against said first holding section of said first outside stator, and said shifted portion of said protrusion of said first inside stator is held abutted against said second holding section of said second outside stator.

5. A small electric motor as claimed in claim 4, wherein said first and second outside stators are formed by using cup-shaped motor casings, and cuts are formed in said cup-shaped motor casings which hold said protrusions while abutting against said protrusions, said protrusions being fitted in said cuts so that said inside stators are circumferentially positioned with respect to said outside stators.

6. A small electric motor as claimed in claim 1, wherein said motor has bobbins on which said coils are wound, and said bobbin of said first stator unit has said first holding section, while said bobbin of said second stator unit has said second holding section.

7. A small electric motor as claimed in claim 6, wherein said first and second inside stators, and said first and second outside stators have pole teeth which are confronted with a rotor.

8. A small electric motor as claimed in claim 1, wherein said first and second inside stators are provided as one unit being laid one on another, and when said first inside stator is held being abutted against by said second outside stator, said second inside stator is held being abutted against said first outside stator.

9. A small electric motor comprising:

a first stator unit including a first outside stator forming a part of a motor casing, a first inside stator provided inside said motor, and a coil between said first outside stator and said first inside stator; and a second stator unit including a second outside stator forming a part of said motor casing, a second inside stator provided inside said motor, and a coil between said second outside stator and said second inside stator, wherein said first and second stator units are laid one on another in such a manner that said first and second inside stators are positioned between said coil of said first stator unit and said coil of said second stator unit, and said first stator unit has a first holding section which is adapted to position said second inside stator, and said second stator unit has a second holding section which is adapted to position said first inside stator, and wherein said motor has bobbins on which said coils are wound, and said bobbin of said first stator unit has said first holding section, while said bobbin of said second stator unit has said second holding section.

* * * * *